United States Patent
Grosskopf et al.

(10) Patent No.: US 9,989,138 B2
(45) Date of Patent: Jun. 5, 2018

(54) INTEGRATED DRIVE GENERATOR HAVING A VARIABLE INPUT SPEED AND CONSTANT OUTPUT FREQUENCY AND METHOD OF DRIVING

(75) Inventors: Andrew P. Grosskopf, Rockford, IL (US); Glenn C. Lemmers, Jr., Loves Park, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 960 days.

(21) Appl. No.: 13/457,002

(22) Filed: Apr. 26, 2012

(65) Prior Publication Data

US 2013/0288840 A1 Oct. 31, 2013

(51) Int. Cl.
| | |
|---|---|
| *F16H 47/04* | (2006.01) |
| *H02K 7/10* | (2006.01) |
| *H02K 7/116* | (2006.01) |
| *F16H 37/08* | (2006.01) |

(52) U.S. Cl.
CPC .............. *F16H 47/04* (2013.01); *H02K 7/10* (2013.01); *H02K 7/116* (2013.01); *F16H 2037/088* (2013.01); *H02K 2213/09* (2013.01)

(58) Field of Classification Search
CPC ...... F16H 47/04; F16H 2037/088; H02K 7/10
USPC .................. 475/72, 76, 77, 84, 88
See application file for complete search history.

(56) References Cited

U.S. PATENT DOCUMENTS

| | | | | |
|---|---|---|---|---|
| 2,946,194 | A * | 7/1960 | Westbury ........................ | 60/403 |
| 3,023,638 | A * | 3/1962 | Westbury et al. .............. | 475/77 |
| 3,735,646 | A * | 5/1973 | Roberts ........................... | 475/72 |
| 3,969,957 | A * | 7/1976 | DeLalio ........................... | 475/79 |
| 4,373,408 | A * | 2/1983 | Mills ................................ | 475/72 |
| 4,734,590 | A | 3/1988 | Fluegel | |
| 4,774,855 | A * | 10/1988 | Murrell et al. ................. | 475/31 |
| 6,533,695 | B2 * | 3/2003 | Pollman et al. ................ | 475/72 |
| 6,663,525 | B1 * | 12/2003 | McKee et al. .................. | 475/72 |
| 7,297,084 | B2 * | 11/2007 | Kimura et al. ................. | 475/59 |
| 2008/0155974 | A1 * | 7/2008 | Aitzetmueller et al. ........ | 60/325 |

FOREIGN PATENT DOCUMENTS

| | | |
|---|---|---|
| EP | 1479943 A1 | 11/2004 |
| WO | 8707785 | 12/1987 |

OTHER PUBLICATIONS

Search Report regarding related EP App. No. 13165271.1; dated Jun. 1, 2017; 7 pgs.

* cited by examiner

*Primary Examiner* — Colby M Hansen
(74) *Attorney, Agent, or Firm* — Cantor Colburn LLP

(57) ABSTRACT

An integrated drive generator having a variable input speed and constant output frequency, where the integrated drive generator includes a generator disposed about a first centerline. Also included is a hydraulic trimming device disposed about a second centerline. Further included is an epicyclic differential having a ring gear and a sun gear, wherein at least one of the ring gear and the sun gear drives the generator at a constant output frequency, wherein the epicyclic differential is disposed about a third centerline, wherein the third centerline is coaxial with the second centerline.

6 Claims, 4 Drawing Sheets

INTEGRATED DRIVE GENERATOR HAVING A VARIABLE INPUT SPEED AND CONSTANT OUTPUT FREQUENCY AND METHOD OF DRIVING

BACKGROUND OF THE INVENTION

The present invention relates to an integrated drive generator, and more particularly to driving the integrated drive generator at a constant output frequency with a variable input speed.

Typically, integrated drive generators comprise a generator, a differential and a hydraulic speed trimming device, with each component requiring at least one major centerline for packaging. The generator and the differential each require one centerline, while the hydraulic trimming device requires from one to three centerlines. Providing each component with at least one centerline poses packaging issues for applications offering a restricted amount of space, such as an aircraft, for example. Additionally, such a configuration leads to undesirable weight and overhang moments for the overall integrated drive generator assembly.

BRIEF DESCRIPTION OF THE INVENTION

According an embodiment, an integrated drive generator having a variable input speed and constant output frequency, where the integrated drive generator includes a generator disposed about a first centerline. Also included is a hydraulic speed trimming device disposed about a second centerline. Further included is an epicyclic differential having a ring gear and a sun gear, wherein at least one of the ring gear and the sun gear drives the generator at a constant output speed, wherein the epicyclic differential is disposed about a third centerline, wherein the third centerline corresponds to the second centerline.

According to another embodiment, an integrated drive generator having a variable input speed and constant output frequency, where the integrated drive generator includes a generator disposed about a first centerline. Also included is a hydraulic trimming device disposed about a second centerline. Further included is an epicyclic differential having a ring gear for driving the generator at a constant output speed, wherein the epicyclic differential is disposed about a third centerline, wherein the third centerline corresponds to the first centerline.

According to yet another embodiment, a method of driving an integrated drive generator is provided. The method includes driving a carrier shaft of an epicyclic differential and a variable component of a hydraulic speed trimming device that is operably coupled to a sun gear of the epicyclic differential. Also included is driving a generator with an output ring gear that is maintained at a constant output speed. Further included is maintaining the constant output frequency by controllably manipulating the speed of the sun gear that is in operable communication with the output ring gear.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
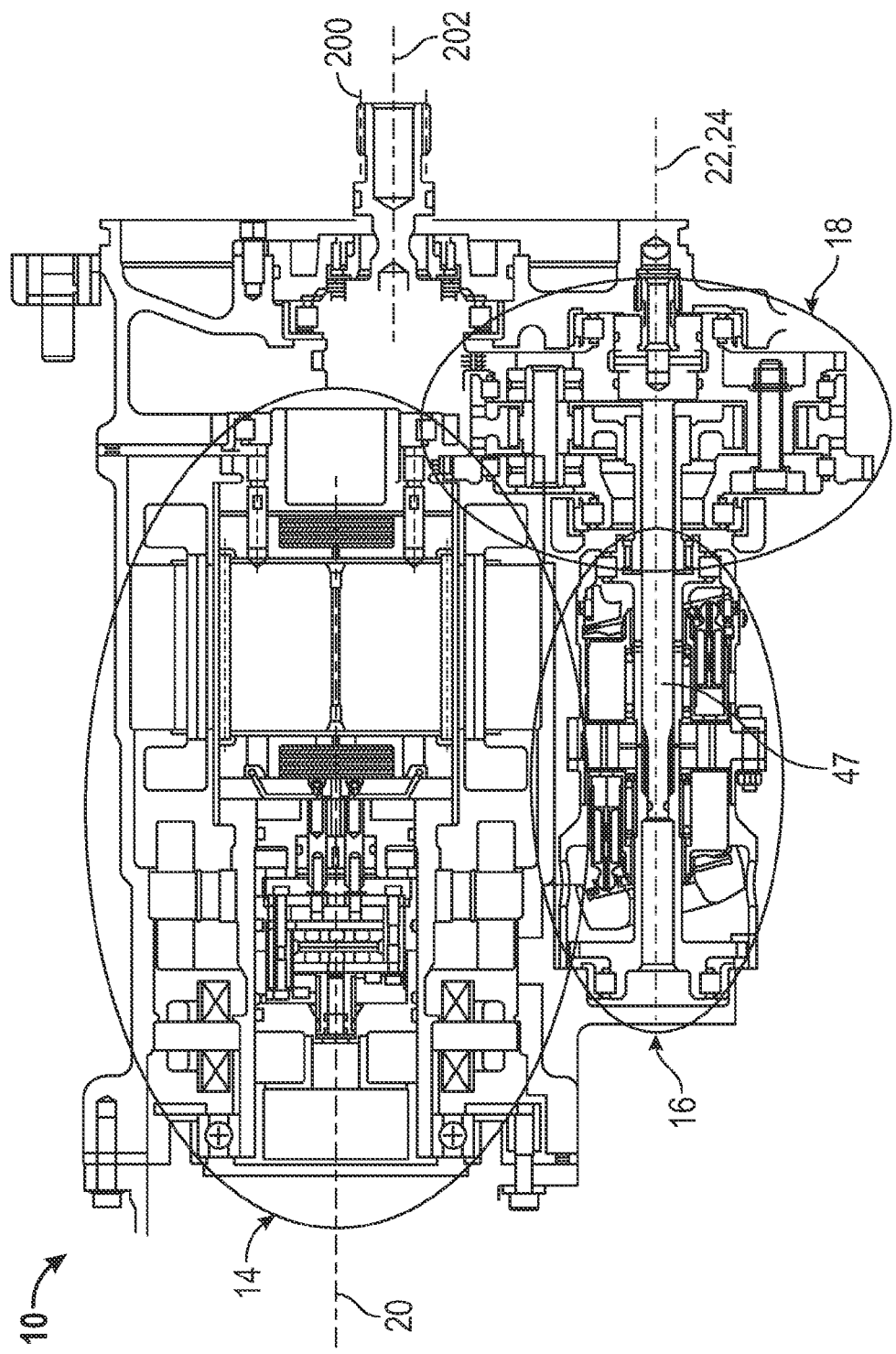
FIG. 1 is a cross-sectional view of an integrated drive generator.
Figure 2:
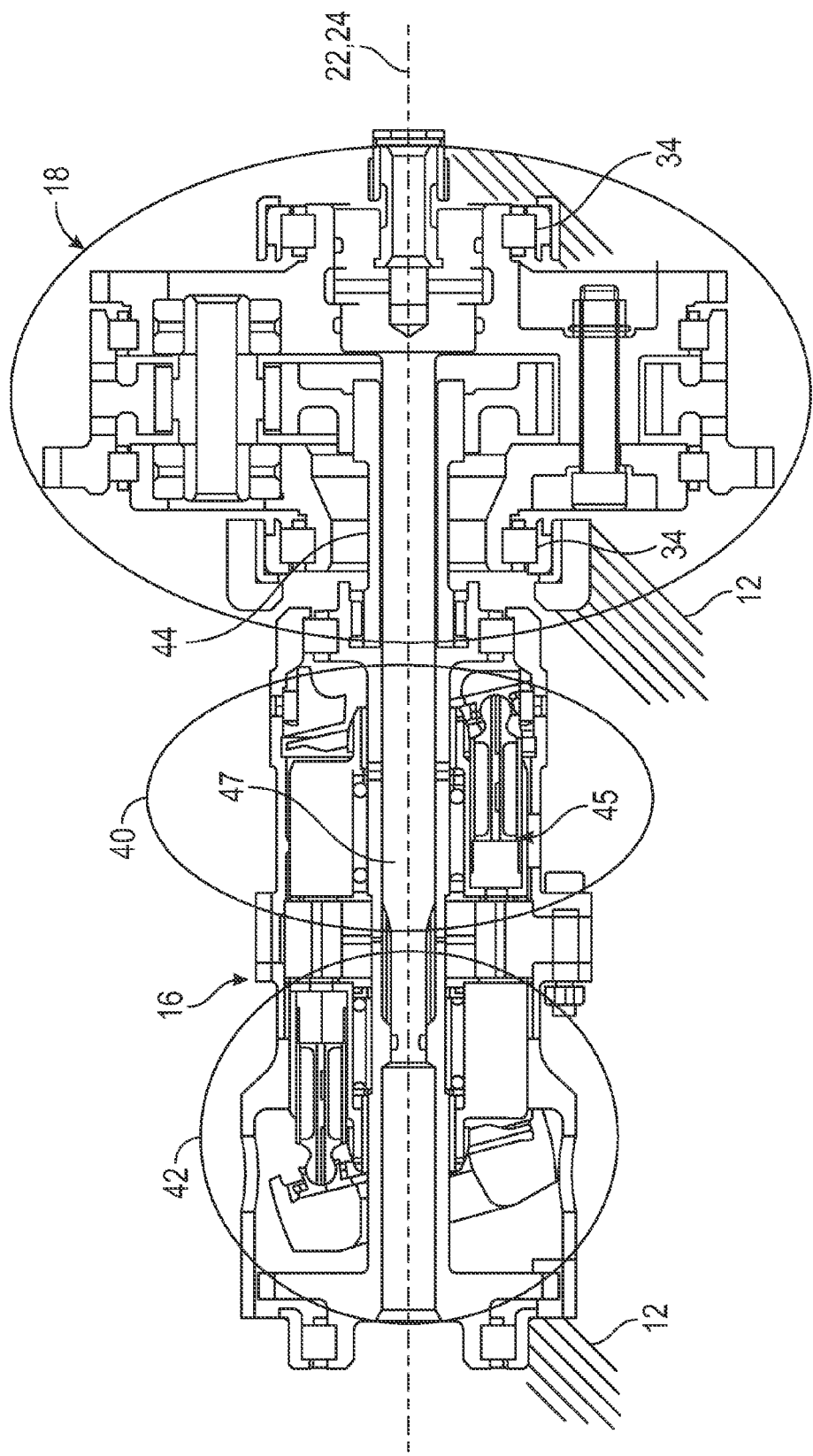
FIG. 2 is a cross-sectional view of a hydraulic trimming device and an epicyclic differential of the integrated drive generator.

Referring to FIGS. 1 and 2, an integrated drive generator (IDG) is illustrated and generally referred to with numeral 10. The IDG 10 may be used in a variety of applications, with one such application being an aircraft, for example. The IDG 10 is configured to receive rotational energy on the input shaft 200 at varying rotational (e.g., input) speeds from a prime mover (not illustrated) and produce output electricity with a constant frequency. The IDG 10 comprises three major components disposed within a housing 12. Specifically, IDG 10 includes: a generator 14, a hydraulic speed trimming device 16 and an epicyclic differential 18 are disposed within the housing 12.

The generator 14 produces an electrical output having a constant output frequency, such as 3-phase 115 VAC at 400 Hz. In order to produce the output with a constant frequency, the generator 14 spins at a constant speed. The hydraulic speed trimming device 16 is disposed proximate to the generator 14 and hydro-mechanically regulates the speed of rotational energy provided to the generator 14. In particular, regardless of variations in the rotation speed of prime mover, the hydraulic speed trimming device 16 is configured to provide rotational energy that adds or subtracts speed through the epicyclic differential 18 to the input shaft 200 so that the generator 14 speed is constant. In one embodiment, the hydraulic speed trimming device 16 comprises a variable displacement side and a fixed displacement side axial piston pump and motor combination. The variable side is driven by a shaft 47 that is coupled to a carrier shaft 28 of the epicyclic differential 18.

The epicyclic differential 18 is operably coupled to the hydraulic speed trimming device 16 and forms a gear relationship with the generator 14 and the input shaft 200, as described in detail below. Each of the generator 14, the hydraulic speed trimming device 16 and the epicyclic differential 18 include, and are disposed about, a first centerline 20, a second centerline 22 and a third centerline 24, respectively. The input shaft 200 in this illustration is on another centerline 202. However, the input shaft 200 could also be packaged on various other centerlines in alternative embodiments. In the illustrated embodiment, the third centerline 24 of the epicyclic differential 18 corresponds to the second centerline 22 of the hydraulic speed trimming device 16, such that the epicyclic differential 18 and the hydraulic speed trimming device 16 are relatively co-axially aligned. Although illustrated and described in the aforementioned configuration, it is contemplated that the third centerline 24 corresponds to the first centerline 20, such that the epicyclic differential 18 and the generator 14 are relatively co-axially aligned. The precise configuration will be dictated by the packaging constraints imposed by the specific application in which the IDG 10 is employed and it is to be appreciated that the configurations described above provide packaging flexibility and the ability to more compactly arrange the components of the IDG 10.

Figure 3:
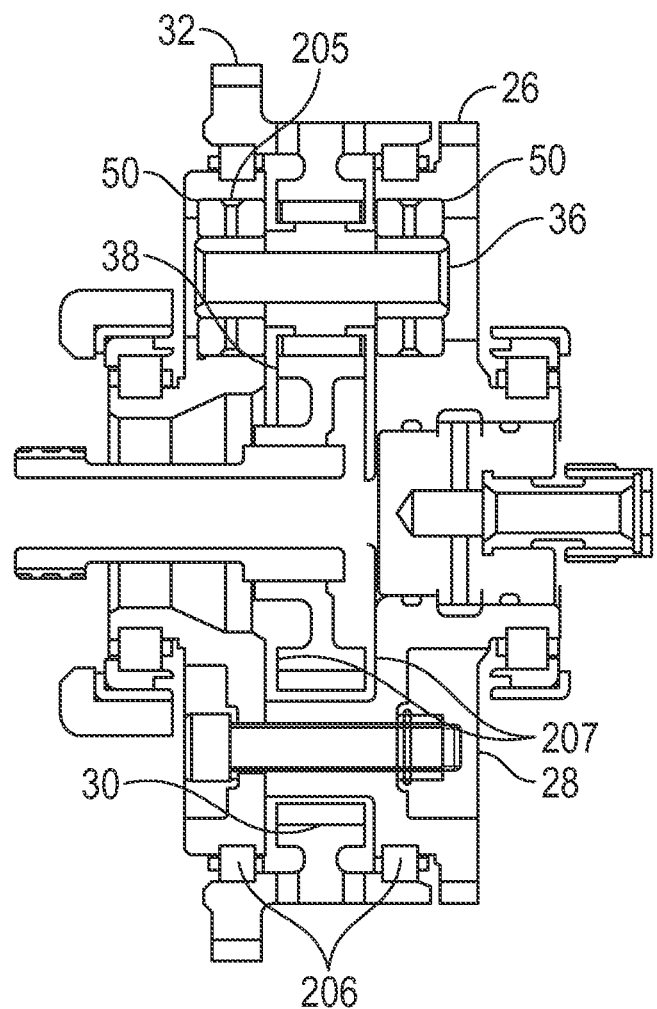
FIG. 3 is a cross-sectional view of the epicyclic differential.

Referring now to FIGS. 2 and 3, the epicyclic differential 18 includes an input gear 26 that is coupled to an output shaft of the prime mover. This could be accomplished by using an input shaft 200 to the input gear 26. The input gear 26 transmits power to drive the carrier shaft 28 of the epicyclic differential 18, with the carrier shaft 28 driving a ring gear 30. The carrier shaft 28 is also coupled to the variable side of the hydraulic speed trimming device 16 by the shaft 47 or other type of coupling. The epicyclic differential 18 is disposed on bearings 34 within the housing 12 and is mounted therein. Additionally, the epicyclic differential 18 includes at least three planet gears 36 and a sun gear 38 that work in conjunction with the hydraulic speed trimming device 16 to maintain the constant output speed of the ring gear 30, and consequently the constant output frequency of the generator 14. The three planet gears 36 mesh with the ring gear 30, as well as the sun gear 38 The planet gears 36 are supported by carbon journal bearings 50. The carbon journal bearings 50 allow for low or zero speed operation of the planet gears 36 while they are loaded, as well as high speed operation. The carbon journal bearings 50 require minimal oil for cooling and lubrication. Lubrication is provided by passages 205 that are supplied by passages in the carrier shaft 28. The bores of the journal bearings 50 are match machined (line bored) to the carrier shaft 28. This provides accurate location and perpendicularity for the planet gears 36 which in turn locate the sun gear 38. If the planet gears 36 were not accurately located, the sun gear 38 could have excessive movement or float and would have excessive wear that could lead to premature failure. The carrier shaft bearing races 206 are also match machined. This aids in locating the ring gear 30 so that the planet gears 36 are not caused to shift off location and result in premature wear. The sun gear 38 is axially located within the carrier shaft 28 by thrust washers 207. The thrust washers 207 provide a bearing surface for the sun gear 38 to prevent wear, but also allows some axial movement of the sun gear 38 within the carrier shaft 28. The male splines on the shaft 44 also are crowned. This allows the sun gear 38 to float and not be bound by the shaft 44 or resulting torsional loads when transmitting power.

As described above, the hydraulic speed trimming device 16 is operably coupled to the epicyclic differential 18 and comprises a fixed displacement side 40, as well as a variable displacement side 42. The fixed displacement side 40 is operably coupled to the sun gear 38 of the epicyclic differential 18 via a splined coupling 44, which is connected to a fixed block 45 of the hydraulic trimming device 16, while the variable displacement side 42 is operably coupled to the carrier shaft 28 of the epicyclic differential 18 via a splined shaft 47. The prime mover is thus also operably connected to a variable component of the hydraulic trimming device 16 because the carrier shaft 28 is coupled to the prime mover by the input shaft 200.

In operation, the epicyclic differential 18 operates at various conditions based on the varying input speed generated by the prime mover. Specifically, a "straight through" speed occurs when the speed of the carrier shaft 28 is such that the output gear 32 is driven at a ring gear speed corresponding to the predetermined speed and capable of driving the generator 14 at the desired output frequency. In such a condition, the hydraulic trimming device 16 fixes the sun gear 38 speed to zero rpm and the input shaft 200 coupled to the generator at a predetermined gear ratio to maintain a desired output frequency. A second condition is described as a "below straight through" speed, where the varying input speed is driving the carrier shaft 28 at a speed such that the output gear 32 is driven at a ring gear speed lower than the predetermined speed (if the sun gear 38 were held in fixed or non-rotating position) and not capable of driving the generator 14 such that it produces electricity at the constant output frequency. In such a condition, the sun gear 38 must increase in speed to drive the ring gear 30 at the predetermined speed. Speed is added by rotating the sun gear 38 opposite of the rotation of the carrier shaft 28. This is achieved by adding speed to the sun gear 38 via the hydraulic speed trimming device 16, where the variable displacement side 42 of the hydraulic speed trimming device 16 is the pump and the fixed displacement side 40 is the motor. The third condition is described as an "above straight through" speed, where the varying input speed is driving the carrier shaft 28 at a speed such that the ring output gear 32 is driven at a ring gear speed greater than the predetermined speed (if the sun gear 38 were held in fixed or non-rotating position) and driving the generator 14 at a frequency greater than the constant output frequency. In such a condition, the sun gear 38 must decrease in speed to drive the ring gear 30 at the predetermined speed. Speed is subtracted by rotating the sun gear 38 in the same direction of rotation as the carrier shaft 28. This is achieved by decreasing the speed of the sun gear 38 and/or switching the direction of rotation of the sun gear 38 (compared to below straight through speed), where the variable displacement side 42 of the hydraulic trimming device 16 is the motor and the fixed displacement side 40 is the pump.

Figure 4:
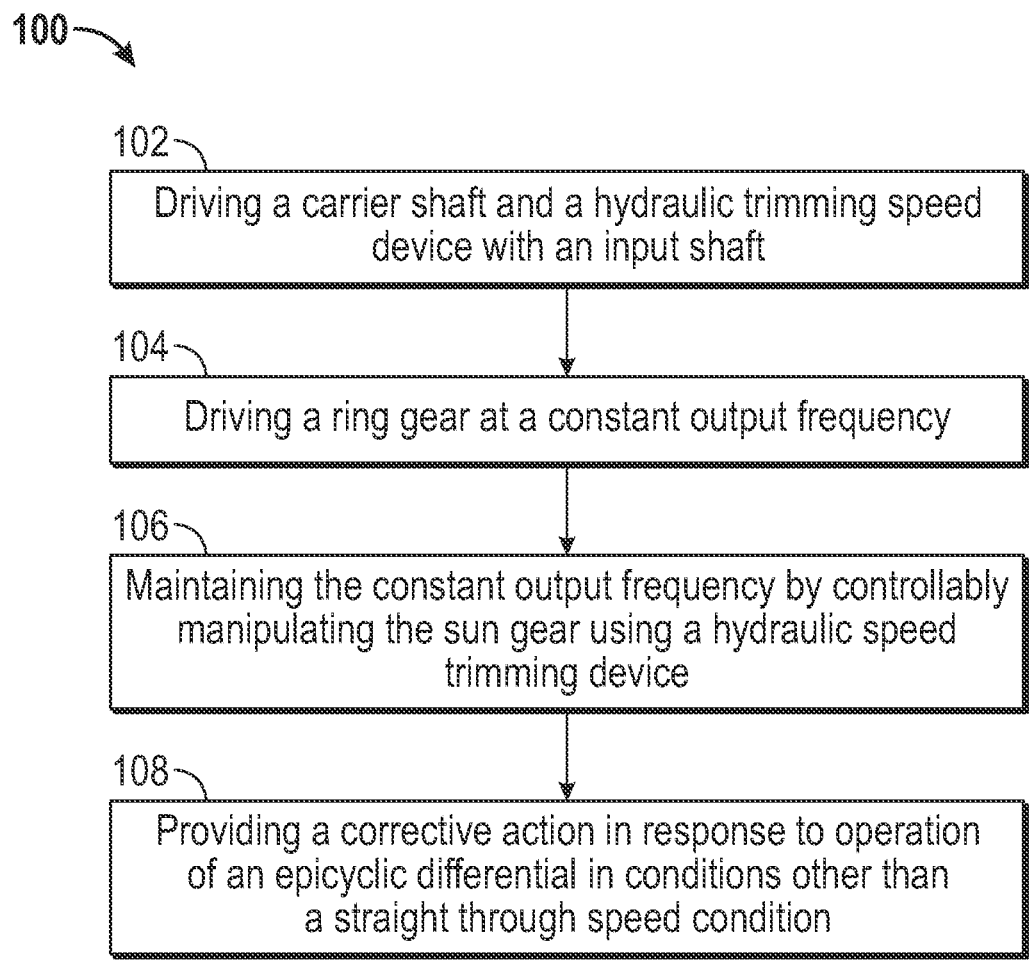
FIG. 4 is a flow diagram illustrating a method of driving the integrated drive generator.

Referring now to FIG. 4, a method of driving 100 the IDG 10 is also provided. The IDG 10 has been previously described and specific structural components need not be described in further detail. The method of driving 100 includes driving a carrier shaft and a variable side of a hydraulic speed trimming device with an input shaft 102. The generator 14 is driven 104 by the ring gear 30 and the fixed side of a hydraulic speed trimming device at a constant output frequency that is to be maintained by controllably manipulating 106 the carrier shaft 28, which is in operable communication with the sun gear 38. Maintaining the constant output frequency is accomplished by providing a corrective action 108 in response to operation of the epicyclic differential 18 input shaft speeds within a desired speed range.

Accordingly, the overall configuration of the IDG 10 provides flexible and compact packaging options by reducing the number of component centerlines, while maintaining robust component interfaces that do not compromise IDG 10 operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An integrated drive generator having a variable input speed and a constant output frequency, the integrated drive generator comprising:
   a generator disposed about a first centerline;

a hydraulic trimming device disposed about a second centerline; and an epicyclic differential having a ring gear and a sun gear, wherein at least one of the ring gear and the sun gear drives the generator at a constant output speed, wherein the epicyclic differential is disposed about a third centerline, wherein the third centerline is coaxial with the second centerline, the first centerline distinctly oriented relative to the coaxial second and third centerlines.

2. The integrated drive generator of claim 1, wherein the epicyclic differential further comprises at least three planet gears, and a carrier shaft.

3. The integrated drive generator of claim 2, wherein the hydraulic trimming device comprises a hydraulic pump and a motor.

4. The integrated drive generator of claim 2, wherein the hydraulic trimming device is operably connected to the epicyclic differential.

5. The integrated drive generator of claim 4, wherein a variable displacement portion of the hydraulic trimming device is operably coupled to the carrier shaft and a fixed displacement portion of the hydraulic trimming device is operably coupled to the sun gear.

6. The integrated drive generator of claim 1, wherein an output gear is disposed between the ring gear and the generator for driving the generator at a constant output frequency.

* * * * *